United States Patent [19]

Yoshimaru et al.

[11] 4,439,797
[45] Mar. 27, 1984

[54] RECORDING TAPE FOR USE IN A RECORDING AND REPRODUCING APPARATUS

[75] Inventors: Tomohisa Yoshimaru; Mitsuo Yamashita, both of Yokohamashi; Junichi Daigo, Nagareyamashi, all of Japan

[73] Assignee: Tokyo Shibaura Denki Kabushiki Kaisha, Tokyo, Japan

[21] Appl. No.: 188,099

[22] Filed: Sep. 17, 1980

[30] Foreign Application Priority Data

Sep. 29, 1979 [JP] Japan .................................. 54-125478

[51] Int. Cl.$^3$ .......................... G11B 5/78; G11B 23/14
[52] U.S. Cl. ...................................... 360/134; 360/72.2
[58] Field of Search ..................... 360/72.2, 134, 78

[56] References Cited

U.S. PATENT DOCUMENTS

| | | | |
|---|---|---|---|
| 2,954,546 | 9/1960 | Burns, Jr. et al. | 360/72.2 |
| 3,781,490 | 12/1973 | Phillips | 360/78 X |
| 3,946,959 | 3/1976 | Sawazaki et al. | 242/55.19 A |
| 4,131,926 | 12/1978 | Morimoto | 360/134 |

FOREIGN PATENT DOCUMENTS

| | | | |
|---|---|---|---|
| 30220 | 3/1931 | Australia | 360/134 |
| 2702971 | 7/1977 | Fed. Rep. of Germany | 360/134 |
| 52-55608 | 7/1977 | Japan | 360/134 |

*Primary Examiner*—John H. Wolff
*Attorney, Agent, or Firm*—Schuyler, Banner, Birch, McKie & Beckett

[57] ABSTRACT

A recording and reproducing system which uses a recording medium having a plurality of information recording tracks for recording image information. And at least one index recording track is located on the recording medium for recording index information. The index recording track is located substantially at the center of the recording medium and extends length wise of the recording medium in the direction of movement of this recording medium. Accordingly, the recording medium of the present invention eliminates the adverse effect of the drop-out and reduces the period of time required to search for the index information and reproduce image information.

3 Claims, 8 Drawing Figures

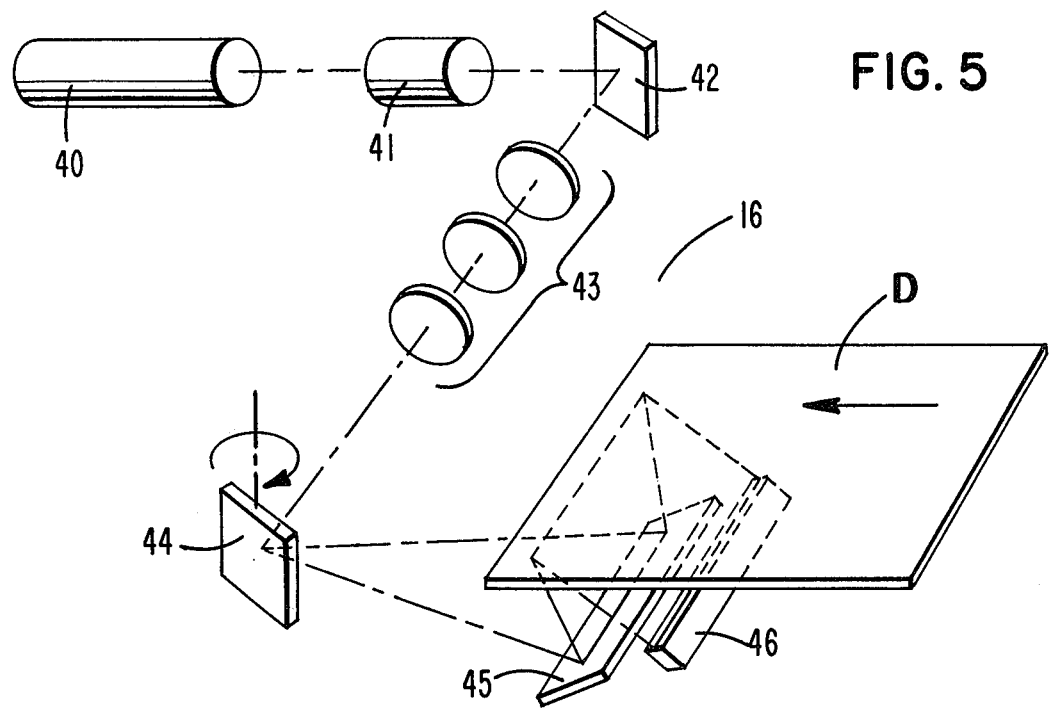
FIG. 5
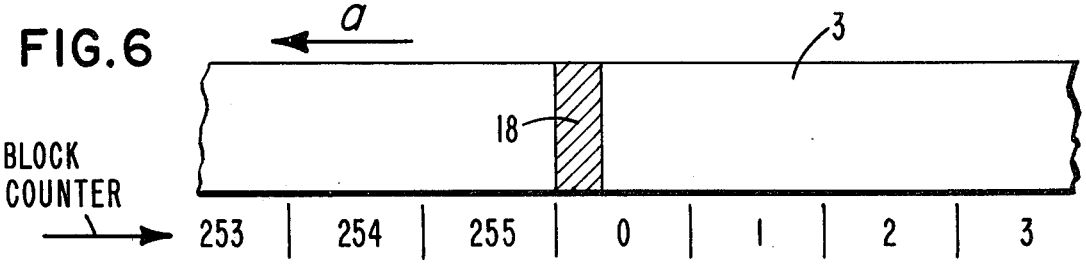
FIG. 6
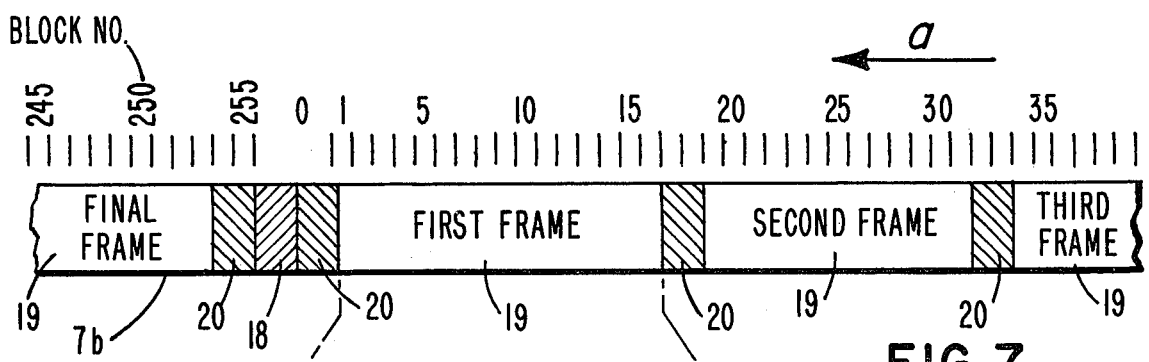
FIG. 7
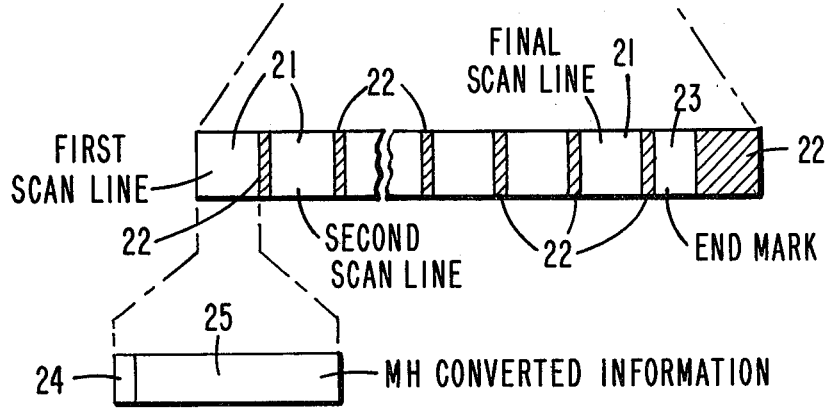

RECORDING TAPE FOR USE IN A RECORDING AND REPRODUCING APPARATUS

BACKGROUND OF THE INVENTION

The present invention relates to a recording and reproducing system having a recording medium for storing information on recording tracks.

Various information recording and searching systems are known in the art for filing or memorizing image information in an image file. These systems search for and retrieve necessary information for display and other uses. While many of the image files in these systems are microfile files, magnetic tapes have also been used in lieu of microfilm.

Magnetic tape systems use an endless magnetic tape containing a number of recording tracks extending in the direction of movement or the longitudinal direction. In these systems, a desired recording track is selected by driving the tape while moving a magnetic head in a direction at right angles to the direction of movement of the tape. A video signal of a document or the like which is recorded in the selected recording track is selectively reproduced via the magnetic head.

In the above magnetic tape systems, index information peculiar to units of image information is also recorded with the image information. This index information is used as a search code for searching for the image information. The use of index information results in improved operation control and is very convenient. However, if many code errors occur in the index information because of the drop out of information, erroneous image information probably will be searched out and reproduced. To cope with this problem, it is common practice to provide check bits for checking for code errors. Reproduction only occurs after confirmation that the image information is free from any error. Nevertheless, even in the latter case, if many drop-outs occur, an extended period of time is required to search for the index information and find the image information.

SUMMARY OF THE INVENTION

Is is an object of the present invention to provide a recording and reproducing system which eliminates dropout of information.

It is a further object of the present invention to provide a recording and reproducing system which reduces the period of time for searching for index information.

Finally, it is an object of the present invention to provide a recording and reproducing system which obtains faster and more accurate searching and reproduction of image information.

The present invention is directed to a recording and reproducing system which uses a recording medium having a plurality of information recording tracks for recording image information. The recording medium also includes an index recording track for recording index information. The index recording track is located substantially at the center of the recording medium and extends along the recording medium in the direction of movement.

BRIEF DESCRIPTION OF THE DRAWINGS

FIG. 5 is a diagram illustrating a two-dimensional scanner.

FIG. 6 is a view showing the one-to-one correspondence between the magnetic tape and a block counter.

FIG. 7 is a view showing the format of an information recording track.

DETAILED DESCRIPTION OF THE PREFERRED EMBODIMENT

Figure 1:
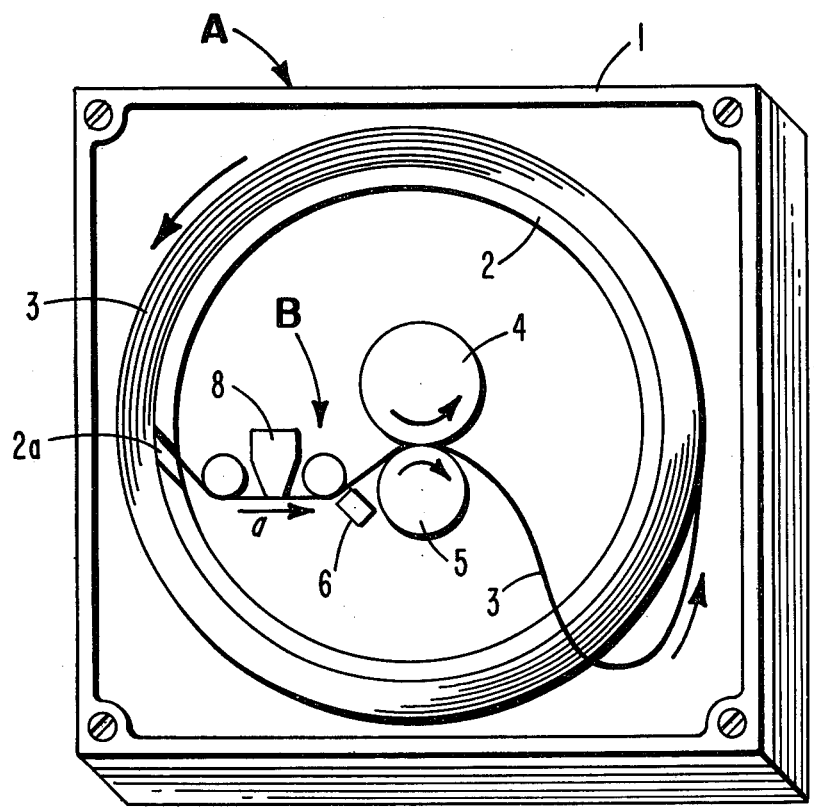
FIG. 1 is a schematic view of a cassette tape and a tape feed mechanism according to the present invention.

Referring now to FIGS. 1–7, an explanation will be given regarding a preferred embodiment of the invention. FIG. 1 shows a cassette tape A and a head feeding mechanism B having a case 1 for supporting a stationary reel 2 on which an endless magnetic tape 3 having a width of ½ inch and length of about 36 m is wound. When the cassette tape A is accomodated to the head feeding mechanism B, the innermost portion of the tape 3 wound on the reel 2 is taken out from a window 2a provided on the reel 2. The tape 3 is fed at a high speed (about 5 m/sec) in the direction of the arrow "a" through a capstan roller 4 and a pinch roller 5 to be wound again on the outer periphery of the tape 3. The head feeding mechanism B moves the tape through one excursion in about 7.2 seconds. One excursion of the tape 3 is confirmed by a mark detector 6 which detects a tape mark (not shown) such as a silver paper piece on a predetermined portion of the back side of the tape 3.

Figure 2:
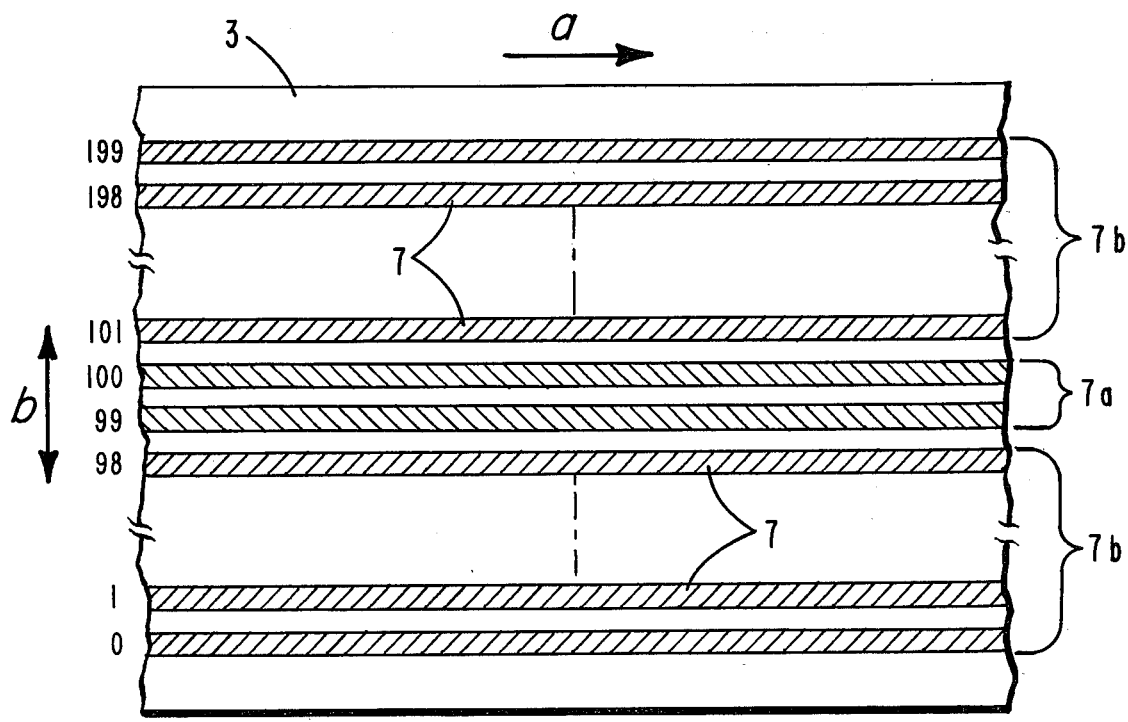
FIG. 2 is a view showing the recording tracks of the recording medium or magnetic tape.

As shown in FIG. 2, the tape has 200 parallel recording tracks (with a track width of about 40 $\mu$m and a track pitch set at about 52 $\mu$m) extending in the longitudinal direction or the direction of tape movement. The tracks 7 are given successive track numbers "0, 1, 2, . . ., 198, 199" from the lowermost track. Of these tracks, two tracks substantially at the center of the tape, i.e., track numbers 99 and 100, (track 99 being a spare track), are index recording tracks 7a for recording index information. The other tracks (track numbers 0 to 98 and 101 to 199) are information recording tracks 7b for recording image information.

Figure 3:
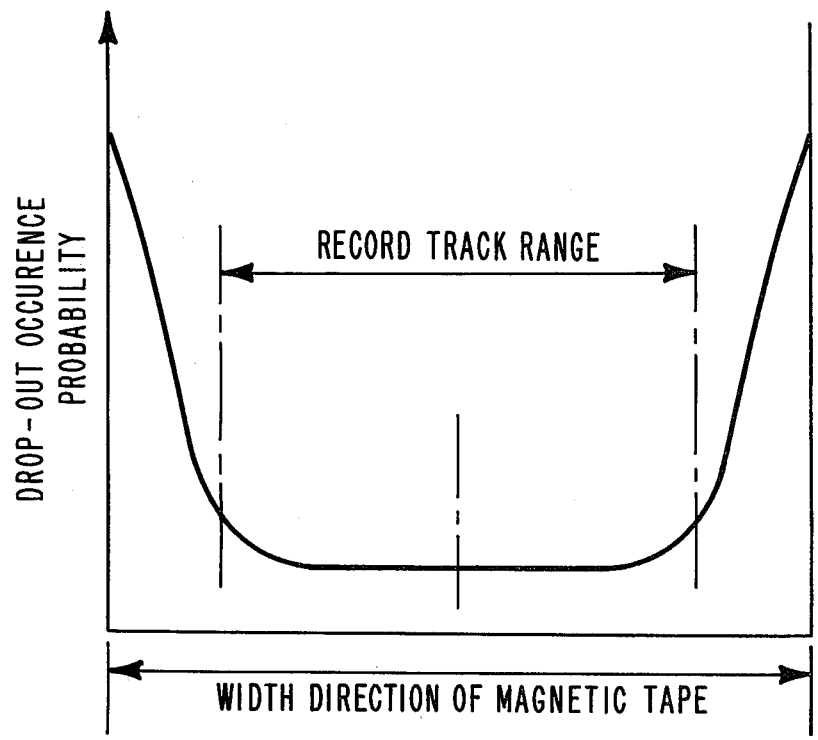
FIG. 3 is a graph showing the drop-out occurrence probability in the lateral direction of the magnetic tape.

FIG. 3 shows the usual or normal drop-out occurence probability as a function of the width of the magnetic tape. The drop-out probability increases at both edges of the tape. Accordingly, the index recording track 7a is provided at the center of the tape 3 or the center of the "RECORD TRACK RANGE" in the longitudinal direction in order to elminate the adverse effect of the drop-out of information along the edges.

The recording of information or tape 3 as well as the reproduction of information from tape 3 are made by selecting a given recording track 7. To this end, a magnetic head 8 or a recording/playback head is used to record and playback information. The magnetic head 8 reciprocates in a stepwise fashion at a step interval of one micron in direction b at right angles to the longitudinal direction or direction of movement of the tape 3. The head 8 is a two gap head which also performs an erasing function.

Figure 4:
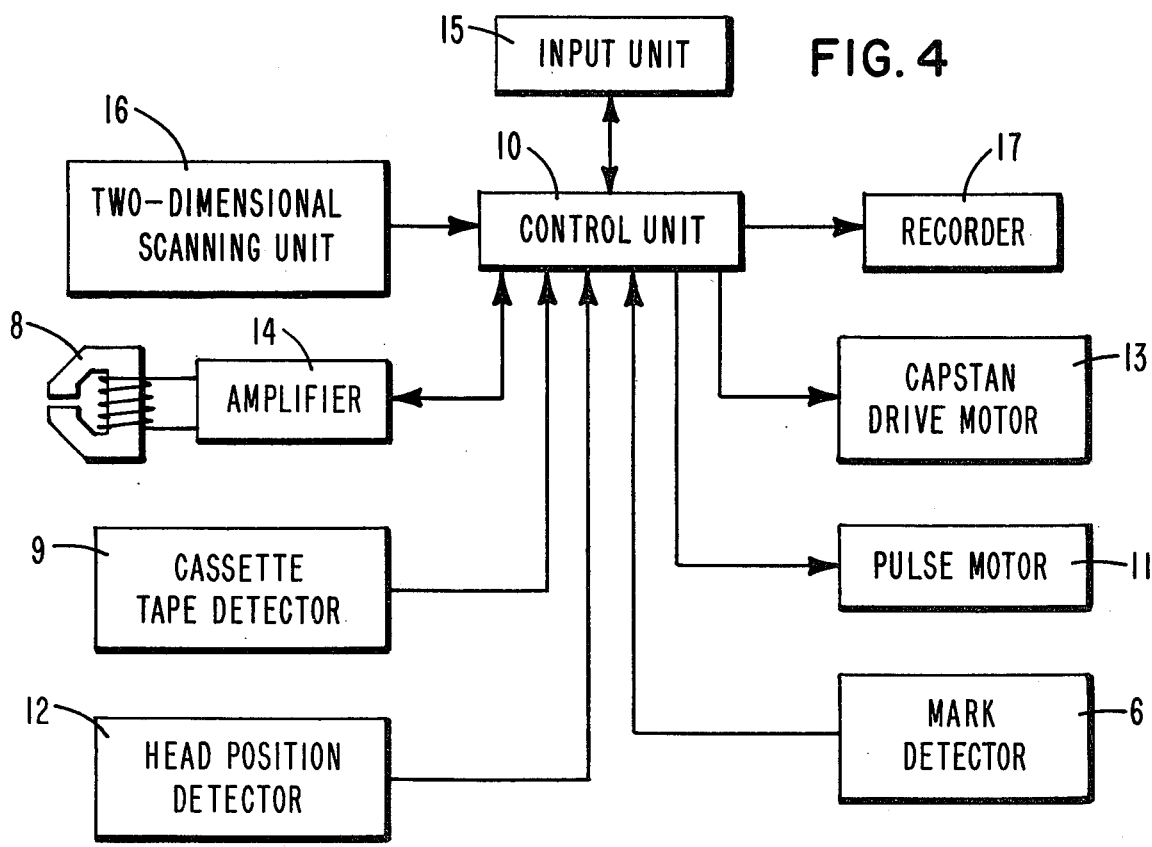
FIG. 4 is a block diagram showing an image information recording and reproducing system using a magnetic tape.

FIG. 4 schematically shows the construction of an image information recording and reproducing system.

When the cassette tape A is accomodated to the head feeding mechanism B as shown in FIG. 1, a cassette tape detector 9 provides a detection signal to control unit 10. The control unit 10, which mainly comprises a CPU (Central Processing Unit), actuates a pulse motor 11 to drive the head 8 until it is moved to a position corresponding to the recording track number "0". The pulse motor 11 is a head drive motor for many part of an access mechanism (not shown) for the head 8. When the head 8 is brought to the position corresponding to the recording track number "0", a head position detector 12 supplies a detection signal to the control unit 10. Consequently, the control unit 10 temporarily stops the pulse motor 11 and then drives the pulse motor 11 again until the head 8 is brought to a position corresponding to one of the index recording tracks 7a (track number "100"). When the head 8 is over index recording track 7a, the control unit 10 drives a capstan drive motor 13 to move the tape 3 for reproducing the index recording track 7a. The reproduced signal is coupled through an amplifier 14 to the control unit 10. The control unit 10 checks this reproduced signal for the index codes recorded on the index recording track 7a. The control unit 10 counts these codes and detects the last recording address of the image information. The number of the codes and the detected address are stored in a RAM (Random Access Memory) (not shown) in the control unit 10.

For example, if an index code of 16 bits, representing the name or title of image information to be filed, is coupled from input unit 15 having a display function such as a keyboard display to control unit 10, then the control unit 10 determines the address in which to record the image information on the basis of the last recorded address memorized in the RAM. The control unit 10 records this recording address together with the coupled index code from the index recording track 7a. At this time, the data in an item block corresponding to the last recording address is preliminarily stored and the index code and recording address recorded as an item block in the index recording track 7a. After recording the index information, the control unit 10 records image information. To this end, it drives the pulse motor 11 to bring the head 8 to a position corresponding to an information recording track 7b, track number corresponding to the afore-mentioned recording address. The control unit 10 also operates a two-dimensional scanner 16 for photoelectrically converting image information to a video signal through an optical two-dimensional scanner. The control unit 10 compresses the image information from the two-dimensional scanner 16 through well-known MH (Modified Hofman) conversion for recording the compressed information in the information recording track 7b via the head 8. When image information for one page is completely recorded in this way, the control unit 10 again drives the pulse motor 11 to bring the head 8 to the position corresponding to the index recording track 7a. Then, when subsequent image information is set in the two-dimensional scanner 16 and an index code is coupled to the control unit 10 from the input unit 15, the same operating sequence is repeated. In this way, image information is recorded or stored on the information tracks 7b of the tape 3.

As shown in FIG. 5, the two-dimensional scanner 16 performs a main scanning with a light receiving device 46, e.g., consisting of CCD (Charge Coupled Device) elements, and an auxiliary scanning through movement of a document D in a direction across the light receiving device 46. In other words, a laser tube 40 emits a laser ray which passes straight through a laser modulator 41 to a fixed mirror 42. The laser ray is deflected by the fixed mirror 42 through a lens unit 43 to a rotating mirror 44. The rotating mirror 44 is located on the side of a document scanning mirror 45 so that the laser ray is deflected to the document scanning mirror 45. The rotating mirror 44 is rotated so that the laser ray scans the document scanning mirror 45 and illuminates the moving document D. The laser ray reflected from the document D is received by the light receiving device 46 and is converted into corresponding image information. The receiving device 46 comprises 1728 CCD elements arranged along a straight line. The auxiliary scanning occurs at a rate of 8.5 lines per mm through movement of the document D in a direction perpendicular to the light receiving device 46.

For example, with an A4 size (210 mm×297 mm) document, the image information contains about 4.36 megabits (1.728×297×8.5 bits) which are coupled to the control unit 10. This image information of 4.36 megabits is compressed to an average of 0.5 megabits is through MH conversion. The afore-mentioned figure "297" represents the length of the A4 size document. The recording on the tape 3 is done by 8-bit serial recording with a parity bit added for every 7 bits so that a document of the A4 size is recorded as image information of about 0.57 (=0.5×8/7) megabits. The afore-mentioned figure "7" is the unit bit number in the MH conversion.

One complete rotation of the tape 3 requires about 7.2 seconds, this rotation being detected by the mark detector 6. The control unit 10 includes a block counter (not shown) which is cleared by the output of the detector 6 for subsequent count-up of clock pulses with a period of about 28 msec in synchronism with the driving of the tape 3. As shown in FIG. 6, the tape 3 may be divided into 256 blocks (numbered from "0" to "255") and the position of each block can be detected from the content of the block counter. At number 18 in FIG. 6 a tape mark is located. The recording is made by serial PCM (Pulse Code Modulation) recording in about 0.65 μsec. for each picture element bit, and about 43 kilobits (=28 msec.−0.65 μsec.) are recorded in one block. As a result, an average of 14 blocks (=0.57 megabits−43 kilobits) are required for recording image information of an A4 size document.

FIG. 7 shows the format of the information recording track for recording therein such image information as picture element information. Image information is recorded in units of 8-bit serial information in each track. Each track has about 15 frames (each for recording therein image information for one document sheet), with two-block gaps (i.e., non-recording areas) reference numeral 20 separating adjacent frames 19. In each frame 19, 8-bit gaps 22 are provided, each image information 21 consisting of a scanning line scanned by the light receiving device 46. Upon completion of the recording of all the image information 21, an end mark 23 is recorded. The image information 21 is recorded by first recording a start mark 24 and then recording MH converted information 25 in serial fashion with a parity bit inserted for every 8 bits. Thus, information from about 3,000 A4 size documents can be filed or stored in one cassette tape.

Figure 8:
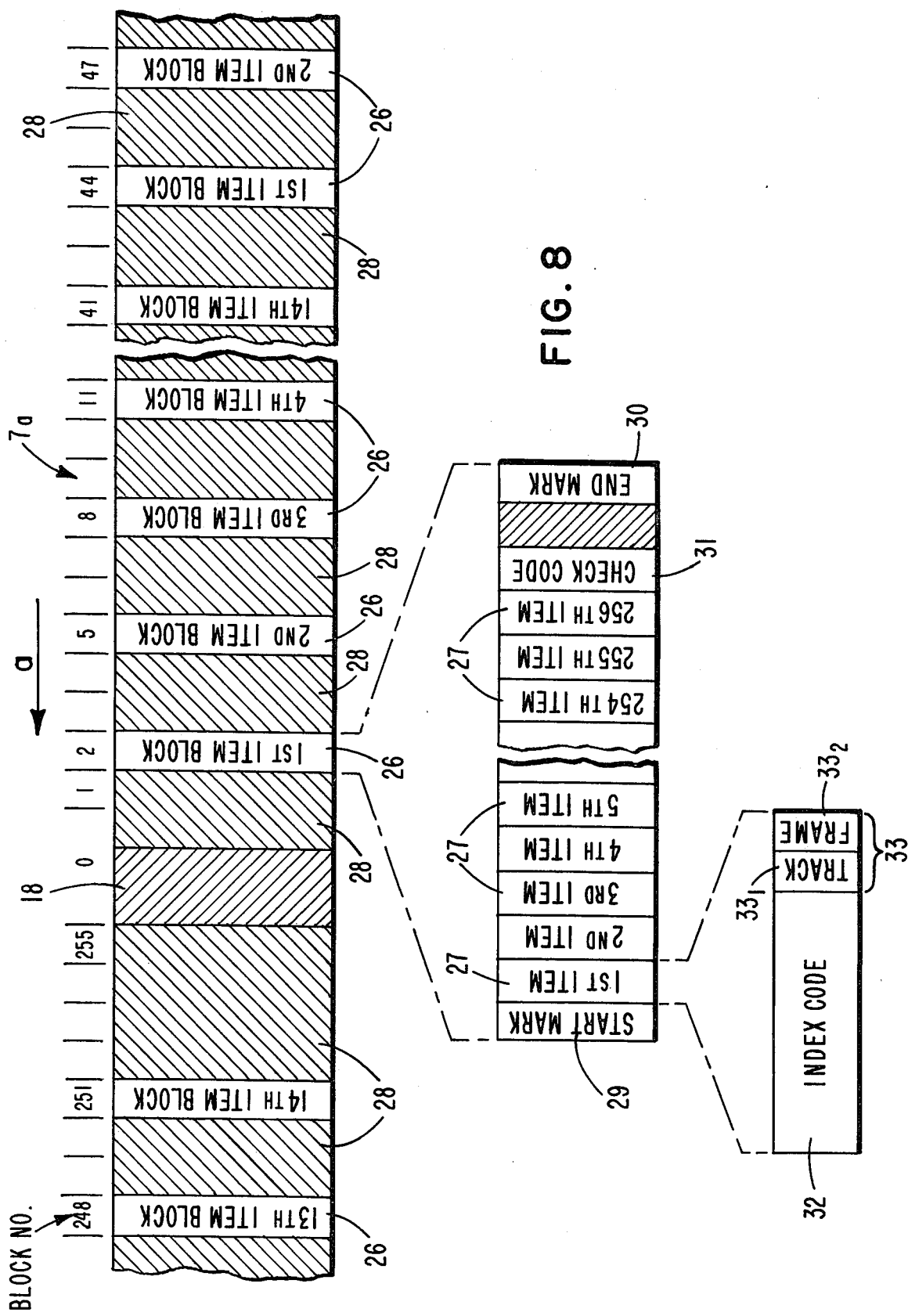
FIG. 8 is a view showing the format of an index recording track.

FIG. 8 shows the format of the index recording track 7a for recording index information which indicates the content of the image information recorded in the image information tracks. The index recording track 7a has fourteen item blocks 26, each of which consists of 256 items 27, and a two-block gap 28 which is provided between adjacent item blocks 26. Thus, a total of 3,584 (=256×14) items can be recorded. In each item block 26, a start mark 29 is first recorded, then successive items 27 are recorded, followed by a check code 31 of 8-bits and an end mark 30. The check code 31 is used to check for errors in reproduction due to drop-out or jitter in the tape drive means. Each item 27 consists of a 16-bit index code 32 and a 3-bit recording address 33 which indicates the position of the relevant image information. The recording address 33 consists of a 2-digit track number address 33a, representing an information recording track where image information is recorded and a 1-digit frame number address 33b representing a frame where image information is recorded. In the index recording track 7a, index information of the same content is recorded a plurality of times to reduce the time required for searching and eliminate the adverse effect of drop-out. For example, the information in an item block 26 is recorded six times. The first item block is recorded in locations numbers "2", "44", "86", "128", "170" and "212" and the 14th item block is recorded in locations numbers "41", "83", "125", "167", "209" and "251".

When the cassette tape A on which image information has been recorded is loaded in the system, the magnetic head 8 is set over the index recording track 7a. Then, by coupling an index code within 16 digits from the input unit 15, the control unit 10 drives the tape 3 for reproducing the index recording track 7a. At this time, the control unit 10 memorizes or stores the item block 26 in RAM and checks the check code 31. When no error is detected, the index codes 32 of the individual items 27 of the item block 26 stored in the RAM are successively compared with the index code. Processing of the check codes and comparison of the index codes occurs while the gap 28 passes through the head 8 between adjacent item blocks 26. When an error is detected, the comparison of the index codes is not made and the next item block 26 is stored in RAM for checking as described above. The above processing then is repeated. If no error is detected, the index codes are compared. Since index information of the same content is recorded six times in the index recording track 7a, when a reproduction error is found, it is not necessary to complete one rotation (7.2 seconds) of the tape 3. Thus, the delay in searching for index information due to reproduction errors is reduced or eliminated.

When none of the compared index codes coincide with the one under considerations, the control unit 10 stores the next item block 26 in RAM and performs the same similar checking and comparison operations as described above. These operations are carried out until the index code coincides with the one under consideration in the control unit 10 whereupon the control unit 10 moves the head 8 to a position in the information recording track 7b corresponding to the track number 33a in the item 27 of the coincident index code 32 and starts the reproduction of that track. At this time, the control unit 10 counts gaps 20 after the detection of a tape mark 18 by the mark detector 6. When the count coincides with the frame number 33b in item 27 of the coincident index code 32, the control unit 10 temporarily stores the reproduced signal, i.e., image information, in a buffer memory (not shown). The control unit 10 obtains the original image information through the converse MH conversion of the reproduced information and supplies it to a recorder 17 for reproduction as hard copy.

Although a preferred embodiment of the present invention has been described with reference to the drawings, it is apparent that various modifications may be made in the recording and reproducing system by one skilled in the art without departing from the scope and spirit of the present invention.

We claim:

1. In a recording and reproducing system having a recording/playback head, a recording tape having a plurality of parallel recording tracks extending lengthwise of said recording tape including a plurality of information tracks and at least one index track, said information tracks storing two-dimensional image information obtained by two-dimensional optical scanning, said index track storing index information including index codes and recording addresses which indicate the position of two-dimensional image information on said information tracks, said index information of the same content being stored a plurality of times on said index track, said index track extending lengthwise near the center of said recording tape and said recording/playback head moving transverse to the direction of movement of said recording tape to select one of said recording tracks.

2. The recording and reproducing system of claim 1 wherein said recording tape is an endless magnetic tape.

3. The recording and reproducing system of claim 1 wherein said index track comprises a plurality of item blocks, at least two of said item blocks containing the same index information.

* * * * *